United States Patent
Reguly et al.

(10) Patent No.: US 11,861,015 B1
(45) Date of Patent: Jan. 2, 2024

(54) RISK SCORING SYSTEM FOR VULNERABILITY MITIGATION

(71) Applicant: Tripwire, Inc., Portland, OR (US)

(72) Inventors: Tyler Reguly, Toronto (CA); Lamar Bailey, Cumming, GA (US); Lane Thames, Atlanta, GA (US); Craig Young, Alpharetta, GA (US)

(73) Assignee: TRIPWIRE, INC., Portland, OR (US)

( * ) Notice: Subject to any disclaimer, the term of this patent is extended or adjusted under 35 U.S.C. 154(b) by 347 days.

(21) Appl. No.: 17/209,050

(22) Filed: Mar. 22, 2021

Related U.S. Application Data

(60) Provisional application No. 62/992,790, filed on Mar. 20, 2020.

(51) Int. Cl.
  *G06F 21/57* (2013.01)
  *G06F 17/11* (2006.01)

(52) U.S. Cl.
  CPC .......... *G06F 21/577* (2013.01); *G06F 17/11* (2013.01); *G06F 2221/034* (2013.01)

(58) Field of Classification Search
  None
  See application file for complete search history.

(56) References Cited

U.S. PATENT DOCUMENTS

| | | | |
|---|---|---|---|
| 7,243,348 B2 | 7/2007 | Good et al. | |
| 7,316,016 B2 | 1/2008 | DiFalco | |
| 7,360,099 B2 | 4/2008 | DiFalco et al. | |
| 7,587,754 B2 | 9/2009 | DiFalco et al. | |
| 7,620,715 B2 | 11/2009 | DiFalco et al. | |
| 7,765,460 B2 | 7/2010 | DiFalco et al. | |
| 7,822,724 B2 | 10/2010 | DiFalco et al. | |
| 8,140,635 B2 | 3/2012 | DiFalco | |
| 8,176,158 B2 | 5/2012 | DiFalco et al. | |
| 8,819,491 B2 | 8/2014 | Whitlock et al. | |
| 8,984,643 B1 * | 3/2015 | Krisher | H04L 63/1408 726/25 |
| 9,634,951 B1 | 4/2017 | Hunt et al. | |

(Continued)

OTHER PUBLICATIONS

Irfahn Khimji, Tripwire, Inc., "Tripwire Vulnerability Risk Metrics," White Paper, © 2019, 8 pages.

(Continued)

*Primary Examiner* — Fatoumata Traore
(74) *Attorney, Agent, or Firm* — Fredrikson & Byron, P.A.

(57) ABSTRACT

Apparatus, methods, and articles of manufacture or disclosed for implementing risk scoring systems used for vulnerability mitigation in a distributed computing environment. In one disclosed example, a computer-implemented method of mitigating vulnerabilities within a computing environment includes producing a risk score indicating at least one of: a vulnerability component, a security configuration component, or a file integrity component for an object within the computing environment, producing a signal score indicating a factor that contributes to risk for the object, and combining the risk score and the signal score to produce a combined risk score indicating a risk level associated with at least one vulnerability of the computing system object. In some examples, the method further includes mitigating the at least one vulnerability by changing a state of a computing object using the combined risk score.

19 Claims, 13 Drawing Sheets

(56) References Cited

U.S. PATENT DOCUMENTS

| | | |
|---|---|---|
| 9,741,017 B2 | 8/2017 | Good et al. |
| 9,766,873 B2 | 9/2017 | Steigleder |
| 10,158,660 B1 | 12/2018 | Reguly et al. |
| 10,313,257 B1 | 6/2019 | Hunt et al. |
| 10,318,894 B2 | 6/2019 | DiFalco et al. |
| 10,382,486 B2 | 8/2019 | Rivers |
| 10,754,959 B1* | 8/2020 | Rajasooriya ............. G06N 7/01 |
| 2002/0196330 A1 | 12/2002 | Park et al. |
| 2004/0024843 A1 | 2/2004 | Smith |
| 2004/0075738 A1 | 4/2004 | Burke et al. |
| 2004/0122962 A1 | 6/2004 | DiFalco et al. |
| 2005/0160480 A1* | 7/2005 | Birt ....................... G06F 11/008 726/25 |
| 2006/0206883 A1 | 9/2006 | Sabbouh |
| 2006/0242277 A1 | 10/2006 | Torrence et al. |
| 2007/0124255 A1 | 5/2007 | DiFalco et al. |
| 2007/0239862 A1 | 10/2007 | Bronez et al. |
| 2008/0016501 A1 | 1/2008 | Muhlestein et al. |
| 2008/0021912 A1 | 1/2008 | Seligman et al. |
| 2008/0168420 A1 | 7/2008 | Sabbouh |
| 2008/0189788 A1* | 8/2008 | Bahl .................. H04L 63/1416 726/25 |
| 2010/0005107 A1 | 1/2010 | DiFalco |
| 2010/0043066 A1 | 2/2010 | Miliefsky |
| 2011/0066951 A1 | 3/2011 | Ward-Karet et al. |
| 2011/0138471 A1* | 6/2011 | Van De Weyer ... H04L 63/1433 726/25 |
| 2011/0197094 A1 | 8/2011 | Wagner |
| 2011/0197189 A1 | 8/2011 | Wagner et al. |
| 2011/0197205 A1 | 8/2011 | Wagner et al. |
| 2011/0208841 A1 | 8/2011 | Robertson et al. |
| 2012/0023076 A1 | 1/2012 | Torrence et al. |
| 2012/0179805 A1 | 7/2012 | DiFalco |
| 2012/0210434 A1 | 8/2012 | Curtis et al. |
| 2013/0247205 A1* | 9/2013 | Schrecker ............. G06F 21/577 726/25 |
| 2020/0382546 A1* | 12/2020 | Henderson .......... H04L 63/1433 |

OTHER PUBLICATIONS

Tripwire, Inc., "Advanced Vulnerability Risk Scoring and Prioritization," Solution Brief, © 2019, 3 pages.

Tripwire, Inc., "The Tripwire Vulnerability Scoring System," White Paper, © 2020, 8 pages.

* cited by examiner

FIG. 4

$$\frac{\sum Commonality_{score}}{\sum Vulnerability_{count}}$$

FIG. 5

$$RISK = R^3 \times \left(1 + \frac{Rsa}{100}\right)$$

FIG. 6

$$SKILL = \frac{3}{5} \times Ssa$$

FIG. 7

$$Da = TODAY - PublicationDate$$
$$AGE = 7 \times 10^{-5}x^3 - 0.0259x^2 + 2.3029x + 29.073 \qquad Da \leq 180;$$
$$AGE = 2 \times 10^{-13}x^5 - 1 \times 10^{-9}x^4 + 2 \times 10^{-6}x^3 - 0.0019x^2 + 0.8393x - 79.02 \qquad Da > 180;$$

FIG. 8

$$Wclass_{total} = (ClassificationA \times 2) + (Classification\ B)$$

$$Wclass_{total} = (15 \times 2) + 30$$

$$Wclass_{total} = 60$$

$$Wclass_A = \frac{15}{60} = 0.25$$

$$Wclass_B = \frac{30}{60} = 0.5$$

FIG. 9

$$SCORE = RISK \times SKILL \times \frac{AGE}{10} \times \left(1 + \frac{CAT}{100}\right)$$

FIG. 10

$$Primary = (R + N) \times P$$

FIG. 11

$$V = 1 + \frac{p-1}{T}$$

FIG. 12

$$D = \min\left(1 + \frac{Di}{De}, 2\right)$$

FIG. 13

$$Secondary = V \times D \times E$$

FIG. 14

$$Tertiary = 2.63 \times (1+C) \times (1+I) \times (1+A)$$

FIG. 15

$$Result = Primary \times Secondary \times Tertiary$$

FIG. 16

$$Primary = round(10(S \times F_S \times F_L \times F_T), 2)$$

FIG. 17

$$Secondary = round(F_P + F_O + F_C, 2)$$

FIG. 18

$$Final = Primary \times Secondary$$

FIG. 19

$$\text{Maximum: } Criticality \times 20\%$$
$$\text{Minimum: } -(Criticality \times 20\%)$$

FIG. 20

$$T = Test$$
$$EO = ExecutionOrder$$
$$T_{EO} > MP_{EO} \rightarrow C_{Level} = C_{max} \div (\max(EO) - MP_{EO})$$
$$T_{EO} < MP_{EO} \rightarrow C_{Level} = C_{min} \div (MP_{EO} - 1)$$

FIG. 21

$$T_{EO} > MP_{EO} \rightarrow T_{score} = C_{Level} \times (T_{EO} - MP_{EO})$$
$$T_{EO} = MP_{EO} \rightarrow T_{score} = 0$$
$$T_{EO} < MP_{EO} \rightarrow T_{score} = C_{Level} \times T_{EO}$$

FIG. 22

$$Signal_{new} = \frac{Signal - Signal_{min}}{Signal_{max} - Signal_{min}}$$
$$Signal_{element} = \sum Signal_{new}$$

FIG. 23

$$RISK = SCORE \times Signal_{element}$$

When AGE is greater than 180 days:
2530 → $y = 2\text{E-}13x^5 - 1\text{E-}09x^4 + 2\text{E-}06x^3 - 0.0019x^2 + 0.8393x - 79.02$

RISK SCORING SYSTEM FOR VULNERABILITY MITIGATION

CROSS-REFERENCE TO RELATED APPLICATIONS

This application claims the benefit of U.S. Provisional Application No. 62/992,790 filed on Mar. 20, 2020. The entire disclosure of provisional application No. 62/992,790 is incorporated by reference as if set forth fully herein.

SUMMARY

Apparatus, methods, and articles of manufacture for risk scoring systems for performing liability mitigation and computing environments are disclosed. The disclosed technology includes the calculation of a composite risk score that can be used to identify, prioritize, or mitigate vulnerabilities in a computing environment.

In some examples of the disclosed technology, a computer-implemented method of mitigating vulnerabilities within a computing environment includes producing a risk score indicating at least one of: a vulnerability component, a security configuration component, or a file integrity component for an object within the computing environment, producing a signal score indicating a factor that contributes to risk for the object, combining the risk score and the signal score to produce a combined risk score indicating a risk level associated with at least one vulnerability of the computing system object.

In some examples, the method further includes mitigating one or more of the at least vulnerability by changing a state of at least one object within the computing environment. In some examples, the method further includes mitigating a vulnerability identified in the computing environment using the combined risk score by changing a state of at least one computing object. In some examples, the method further includes displaying the risk score, the signal score, the combined risk score, or an overall risk score using a graphical display coupled to a computing device within the computing environment. In some examples, the producing the vulnerability score comprises determining at least one of: the age of the vulnerability, the skill required to exploit the vulnerability, or the outcome of a successful exploitation of the vulnerability. In some examples, the producing the risk score and/or the signal score comprises indicating a crowned vulnerability deemed to need immediate mitigation. In some examples, the producing the vulnerability score comprises using the age of the vulnerability to model a risk at a first maxima when the age is below a predetermined age, and modeling the risk as increasing when the age is greater than a predetermined age.

A number of different methods of determining a risk score are disclosed. In some examples, the risk score is determined by combining at least one of the following components: a risk component, a skill component, an age component, or a categorization component. In some examples, the risk score is determined by determining a security configuration management score and/or a file integrity management score. In some examples, the signal score is determined by evaluating at least one of a single type component, a criticality component, and/or a test component of an object in the computing environment. In some examples, the signal score is based on at least one of: a name component, a description component, a single type component, a criticality component, a data source component, a data value component, a test count, a test method, a per test data component, a test definition component, and execution order component, a data match component, a midpoint identifier component, as no signal match component, or a no data source available component.

In some examples of the disclosed technology, the combining the risk score and the signal score is based on a criticality indicated by the signal score. In some examples, the producing the vulnerability score, the producing the signal score, or combining the vulnerability score and the risk score includes performing at least one of the operations described in FIGS. 4-23 below and associated text. In some examples, an overall system risk score is computed by combining two or more generated risk scores. In some examples of the disclosed technology, the overall system risk score on a display coupled to a computing system, the display including at least one of a numerical indication of the overall system risk score, a graphical indicator of the overall system risk score, or a color shaded indicator of the overall system or score.

This Summary is provided to introduce a selection of concepts in a simplified form that are further described below in the Detailed Description. All trademarks used herein remain the property of their respective owners. This Summary is not intended to identify key features or essential features of the claimed subject matter, nor is it intended to be used to limit the scope of the claimed subject matter. The foregoing and other objects, features, and advantages of the disclosed subject matter will become more apparent from the following Detailed Description, which proceeds with reference to the accompanying figures.

BRIEF DESCRIPTION OF THE DRAWINGS

FIGS. 4-23 disclose expressions that can be used to determine a risk score in a risk scoring system, as can be implemented in certain examples of the disclosed technology.

DETAILED DESCRIPTION

I. General Considerations

Figure 1:
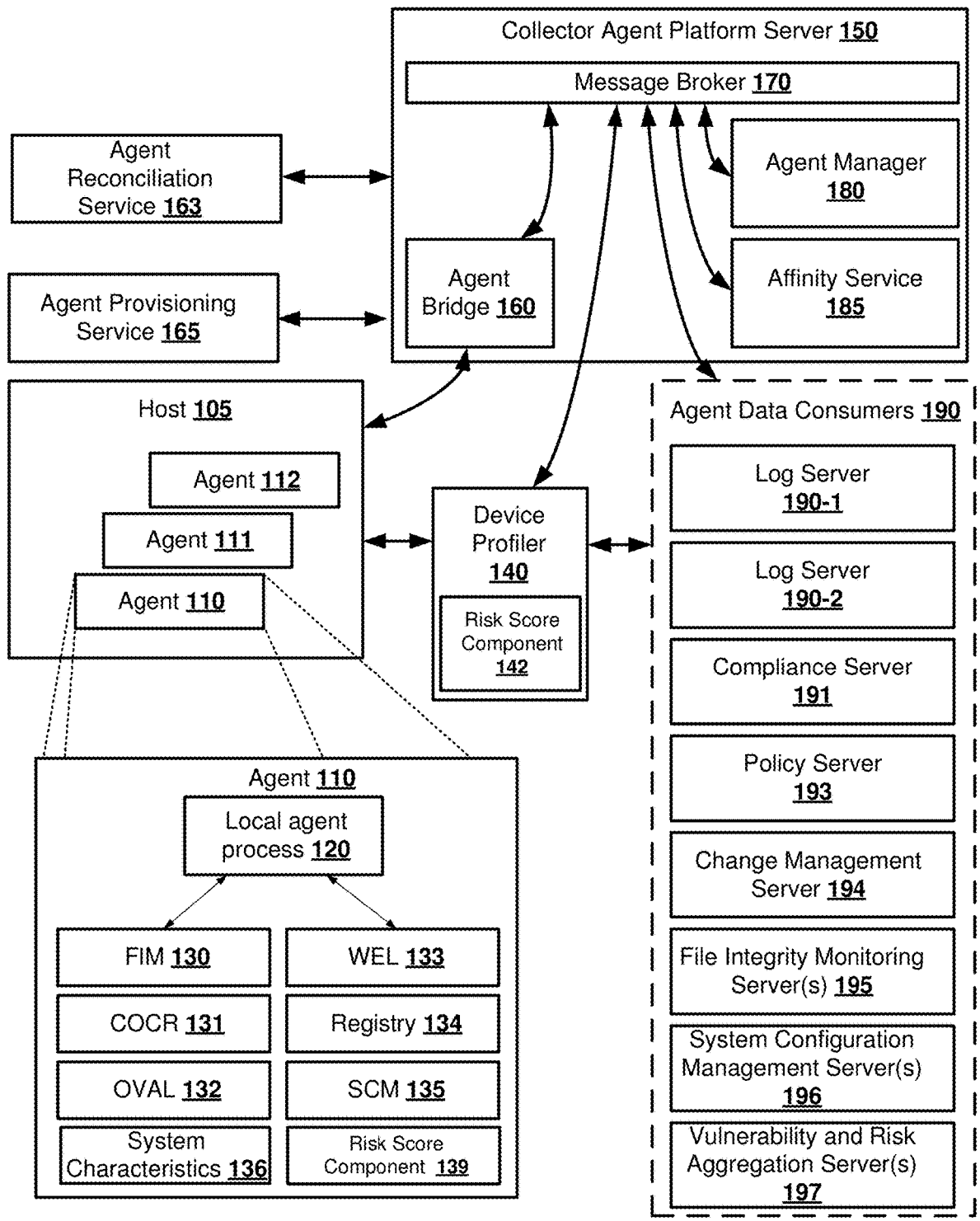
FIG. 1 illustrates an exemplary computing environment in which certain examples of the disclosed technology can be implemented.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," "vulnerability," "weakness," "scan," and "perform" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as an agent executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technology

Apparatus and methods are disclosed for identifying and mitigating vulnerabilities and computer systems, including examples that use a risk score and/or a signal score to assess the impact of vulnerabilities and the relative cost of mitigating such vulnerabilities.

Certain examples disclosed herein use a risk score, which is a representation of the risk that a vulnerability poses to an asset. Vulnerabilities can be identified and mitigated using computer system configuration changes based at least in part on a scoring system that uses skill, risk, and date as factors in evaluating vulnerabilities. A signal score is used to bring external data sources into a risk score calculation to show change in a factor that negatively or positively contributes to risk of a computing elements, host, network, system, or other computing entity. In addition, additional components can be used to enhance risk scoring, and in some examples allow a subject user input to adjust vulnerability scoring. In some examples, certain vulnerabilities may present with a lower risk score when scored objectively than they would when reviewed subjectively. The subjective component of allows security researchers to apply their knowledge and base experience to elevating the score of a vulnerability.

III. Example Computing Network Environment

FIG. 1 illustrates an exemplary computing environment 100 in which some examples of the disclosed technology can be implemented. For example, the computing environment 100 can be used to determine risk scores, and any of the components or subcomponents used to determine risk or for one or more computing objects, host, network, or any other monitored aspect of the computing environment 100. Individual hosts can be monitored by one or more agents executing on the host, or can be inspected externally by a device profiler, as will be discussed further below.

A number of agents 110, 111, and 112 executing on a host 105 are illustrated in FIG. 1. One of the agents 110 is further detailed as shown, and includes a local agent process 120 that can manage and communicate with a number of plugins 130-135 (e.g., a file integrity monitoring (FIM) plugin 130, a command output capture rule (COCR) plugin 131, an Open Vulnerability Assessment Language (OVAL) plugin 132, a Windows event log (WEL) plugin 133, a Registry plugin 134, a Security Configuration Management (SCM) plugin 135, and a system characteristics file 136 that are configured to extend the functionality of the agent. The agent also includes a risk score component plug-in 139 that is used to gather components and subcomponents used in calculating a risk score, and can interact with other plugins executing within the agent process. For example, the plugin 139 can be used to determine an aggregate individual components or subcomponents used to determine the risk score. Further details and examples of agents are discussed further below. As will be readily understood to one of ordinary skill in the relevant art, the agent technology disclosed in this paragraph is not limited to the functionality of agent plugins 130-135, but can be adapted to specific deployments by adding other plugins or removing the depicted plugins. In some examples, and agent/plug-in architecture is not used, but other suitable software/hardware configuration is used to implement disclosed operations.

A device profiler 140 can be used to scan the host that is hosting the agents. The agents can also send data to the device profiler that is generated by executing commands previously, such as when the host is off-line or otherwise not available. These results can be stored in a database or cache at the device profiler 140 and used to assess vulnerabilities on the host. Thus, by not requiring real-time access to the host 105 hosting the agents, system performance can be improved by allowing for cast results to be used.

In examples of the disclosed technology that use the device profiler 140, the device profiler can perform a risk score calculations, including aggregation of component and subcomponents operations used to determine the risk score, including determination of one or more signals scores. Each of the agents 110-112 communicates with the rest of the system depicted in the computing environment 100 via a device profiler agent platform server 150. As shown, the device profiler agent platform server 150 includes an agent bridge 160 for sending messages to and from agents (e.g., agents 110-112). The agent bridge 160 can send messages over a computer network to agents executing on other computers, using inter-process and/or inter-thread communication to agents executing on the same computer as the communication bridge, or by using other suitable communication means.

An agent reconciliation service 163 can be used to match previous agent identifiers and operating system information with current identifiers and current operating system information. This reconciliation service ensures continuity in data and logging information stored in the agent data consumers 190.

An agent provisioning service 165 can be used that informs agents about their initial configuration information, configures the agents with specific combinations of plugins, or provides an upgrade of agent or plugin executable code. The agent provisioning service 165 can send discovery and configuration templates to the agents for execution and configuration of the respective receiving agent.

The illustrated device profiler agent platform server 150 also includes a message broker 170 with multiple message queues for temporarily storing messages received from and sent to, for example, the agent bridge 160, an agent manager 180, an affinity service 185, and agent data consumers 190. In some examples, the message broker 170 has a single message queue. The device profiler agent platform server 150 coordinates operation of the agents by sending and receiving messages using the message broker 170.

Some device profiler agent platform server implementations can contain more than one message broker 170 organized as a network of message brokers. Additionally, some implementations can include additional instances of the agent bridge 160 or the agent manager 180. Various combinations of message brokers, agent bridges, and agent managers can be used to support high-availability and redundant capabilities.

As shown in FIG. 1, the affinity service 185 resides as a component of the device profiler agent platform server 150 (e.g., as a standalone process executing on the device profiler agent platform server 150), while in other examples, the affinity service is hosted in an alternate location (e.g., as a thread or other component of the agent manager 180).

In some examples of the disclosed technology, for example, in large networks with multiple device profiler agent platform servers 150 and multiple agent data consumers 190, the affinity service 185 would be external to the device profiler agent platform server and centralized to improve communications with all instances of the device profiler agent platform server and destination agent data consumers.

The exemplary computing environment 100 includes a number of destination agent data consumers 190, including, but not limited to, multiple log servers (190-1 and 190-2), a compliance server 191, a policy server 193, a change management server 194, multiple file integrity monitoring (FIM) servers 195, multiple system configuration management (SCM) servers 196, and vulnerability and risk aggregations (VnRA) server 197. In some examples the multiple log servers and/or the multiple FIM servers are hosted on separate virtual machines on the same physical hardware (e.g., a computing server). In some examples, the multiple log servers and/or the multiple FIM servers are hosted on separate physical machines in the same computer network environment. In some examples, multiple log servers and/or the multiple FIM, SCM, and/or VnRA servers are hosted on separate physical machines in different computing environments.

The affinity service 185 provides mappings to the message broker 170 and/or agent bridge 160 in order to direct message flow from the agents (e.g., agents 110-112) to one of the multiple log servers and/or multiple FIM servers. The affinity service 185 can utilize UUIDs in order to identify the agents 110-112 and destination agent data consumers 190.

In some examples, the affinity service 185 maintains a table representing the associations between agents (e.g. agents 110-112) and one or more of the destination agent data consumers 190). The agents can be assigned using a number of methodologies, including but not limited to assignments based on: round robin, load and/or capacity of one or more of the destination agent data consumers 190, geographic location of the agents and/or the destination agent data consumers, network topology (e.g., by physical subnets or virtual local area network (VLAN), function roles (e.g., a respective consumer and/or agent is deployed for product development, testing, staging, or production), version of an agent, and/or version of a destination agent data consumer.

In some examples, the affinity service 185 directs routing of messages from agents by intercepting an agent online message emitted by the agent manager 180. The agent online message is enhanced by providing the product server UUID assigned to the agent by the affinity service 185.

In some examples, the affinity service 185 maintains an affinity map that defines relationships between agents and destination agent data consumers. In some examples, the affinity service is configured to map each of the agents to a respective one of the data consumers. In some examples, the affinity service mapping is based at least in part on one or more of the following: a geographic location of one or more of the agents and/or the destination agent data consumers; topology of a network carrying communication between the destination agent data consumers, device profiler agent platform servers, and/or agent computing hosts; a functional role of one of the agents and/or one of the destination agent data consumers; a version of an agent; and/or a version of a destination agent data consumer.

Different combinations of destination agent data consumers 190 can be deployed in the environment 100 according to the desired compliance and security applications to be performed. These combinations are not limited to a single machine. The agent bridge 160, message broker 170, agent manager 180, or any combination of the destination agent data consumers can execute on separate computers, or separate virtual machines on a single or multiple computers. For example, the compliance server 191 can host a Compliance and Configuration Control (CCC) tool used to detect, analyze, and report on change activity in an IT infrastructure. The CCC tool can assess or receive configurations of the one or more nodes at one or more locations and determine whether the nodes comply with internal and external policies (e.g., government, regulatory, or third-party standards, such as Sarbanes-Oxley, HIPAA, ISO 27001, NIST 800, NERC, PCI, PCI-DSS, Basel II, Bill 198, CIS, DISA, FDCC, FFIEC, GCSx, GLBA, GPG 13, IBTRM, or other IT infrastructure compliance standards). The CCC tool can identify and validate changes to ensure these configurations remain in known and trusted states.

In particular implementations, the CCC tool operates by capturing a baseline of server file systems, desktop file system, directory servers, databases, virtual systems, middleware applications, and/or network device configurations in a known good state. Ongoing integrity checks then compare the current states against these baselines to detect changes. The CCC tool collects information used to reconcile changes detected by the agents 110-112, ensuring they are authorized and intended changes. The CCC tool can crosscheck detected changes with defined IT compliance policies (e.g., using policy-based filtering), with documented change tickets in a change control management ("CCM") system, with a list of approved changes, with automatically generated lists created by patch management and software provisioning tools, and/or against other desired and approved changes. This allows the CCC tool to automatically recognize desired changes and expose undesired changes.

The CCC tool can also generate one or more reports concerning the monitored nodes showing a wide variety of information (e.g., compliance information, configuration information, usage information, etc.) The compliance-related reports generated by the CCC tool can, in some instances, comprise a score for a node that indicates the relative compliance status of the node as a numerical value in a range of possible values (e.g., a score of 1 to 100 or other such numeric or alphabetical range). The CCC tool can also apply a set of one or more tests to the nodes to evaluate the compliance status of one or more nodes. In such embodiments, the compliance-related reports generated by the CCC tool can include the number of devices that passed a particular test as well as the number of devices that failed the test. Further, the CCC tool can store detected change event data in an event log or transmit the event data as soon as it is detected or shortly after it is detected. Event logs typically comprise a list of activities and configuration changes at nodes of the IT network.

An exemplary CCC tool that is suitable for use with the disclosed technology is the Tripwire® Enterprise tool available from Tripwire, Inc. The examples described below are sometimes shown or discussed as being used in connection with the Tripwire Enterprise tool. This particular usage should not be construed as limiting, however, as the disclosed technology can be adapted by those skilled in the art to help monitor and manage IT nodes using other compliance and configuration control tools as well.

The compliance server 191 can also include a security information and event management (STEM) tool that is used to centralize the storage and interpretation of events, logs, or compliance reports observed and generated in an IT management infrastructure. The event, log, and compliance report information is typically produced by other software running in the IT network. For example, CCC tools generate events that are typically kept in event logs or stored in compliance reports, as discussed above. The SIEM can be used to provide a consistent central interface that an IT administrator can use to more efficiently monitor and manage activity and configuration changes in an IT network. As needed, the IT administrator can access and use the CCC tool, which may provide deeper information than that provided by the SIEM. A SIEM tool can also integrate with external remediation, ticketing, and/or workflow tools to assist with the process of incident resolution. Furthermore, certain SIEMs include functionality for generating reports that help satisfy regulatory requirements (e.g., Sarbanes-Oxley, PCI-DSS, GLBA, or any other such requirement or standard such as any of those listed above). For these reasons, SIEM tools are becoming more widely adopted by IT administrators who desire to use a single, centralized interface for monitoring and managing their increasingly complex IT infrastructures.

Logging tools can operate similarly to SIEM tools. Accordingly, for any of the embodiments disclosed below, a logging tool may take the place of a SIEM tool. For ease of readability, however, reference will typically be made to just a SIEM tool. An exemplary tool for logging and SIEM that is suitable for use with the disclosed technology is the Tripwire® Log Center tool available from Tripwire, Inc.

Figure 2:
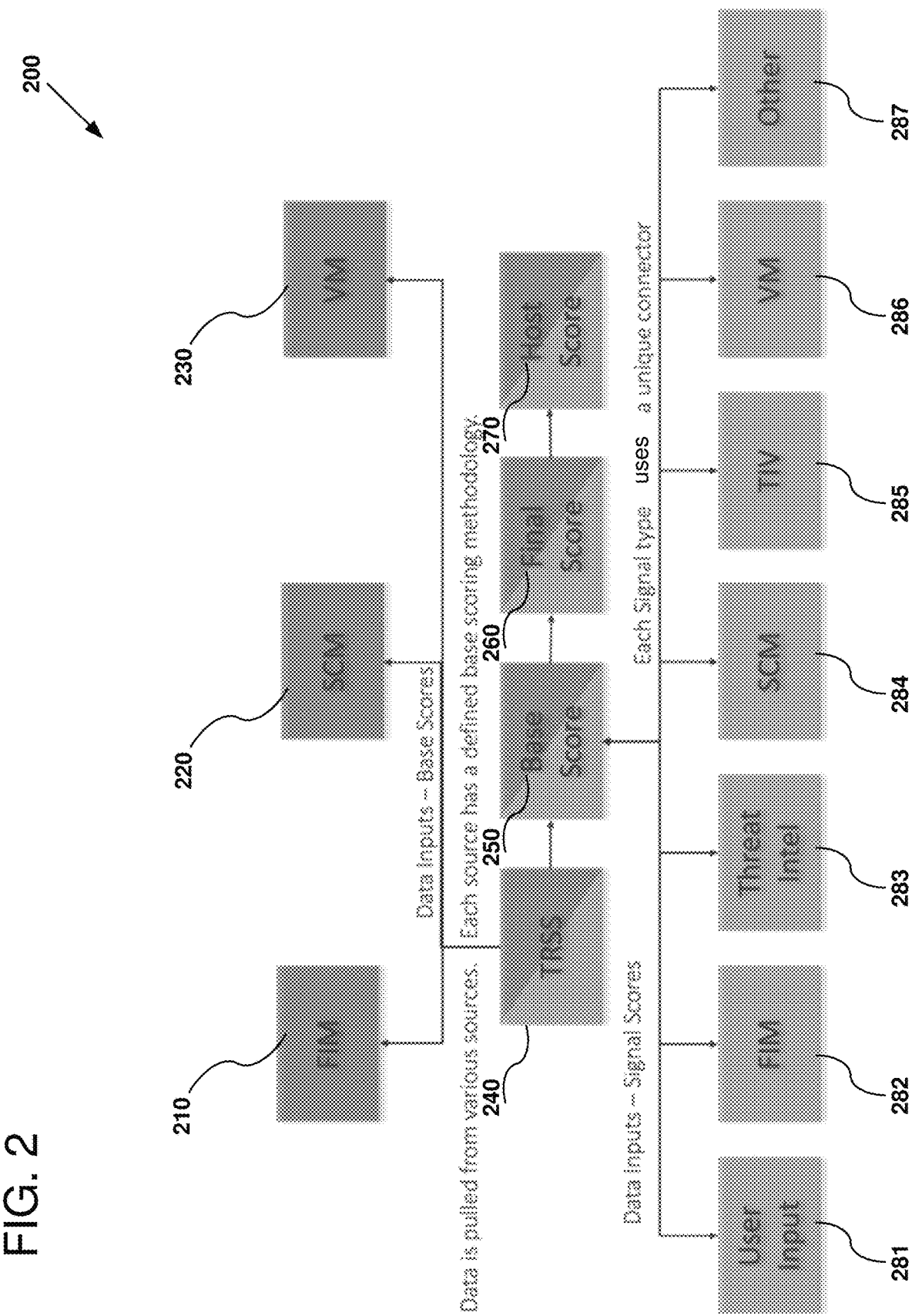
FIG. 2 is a block diagram outlining an example of data flow used to determine vulnerability, risk, and signal scores in accordance with certain examples of the disclosed technology.

IV. Overview of Example Data Flow Used to Determine Vulnerability, Risk, and Signal Scores FIG. 2 is a block diagram 200 outlining an example of data flow used to determine vulnerability, risk, and signal scores in accordance with the disclosed technology. As shown in FIG. 2, a FIM component 210, a SCM component 220, and a VM component 230 are provided that can use a processor to determine a respective FIM score, SCM score, and vulnerability score. These scores are provided to a risk score module 240 which produces a base score 250. The base score module 250 combines a base score determined by the risk score module 240 with a signal score produced by at least one of the illustrated signal score components 281-287. As shown, a signal score indicating the criticality of particular FIM, SCM, and/or vulnerability scores associated with compute objects can be based on user input 281, FIM data 282, threat intelligence 283, SCM data 284, threat intelligence data 285, vulnerability monitoring data 286, or any other suitable source of signal score data 287. For example, a computing environment 100 as discussed above can be used to implement the example data flow. The signal scores and risk scores can be combined to produce and overall risk score 260 and host score 270.

V. Overview of Example Use of Age Modifier

Figure 3:
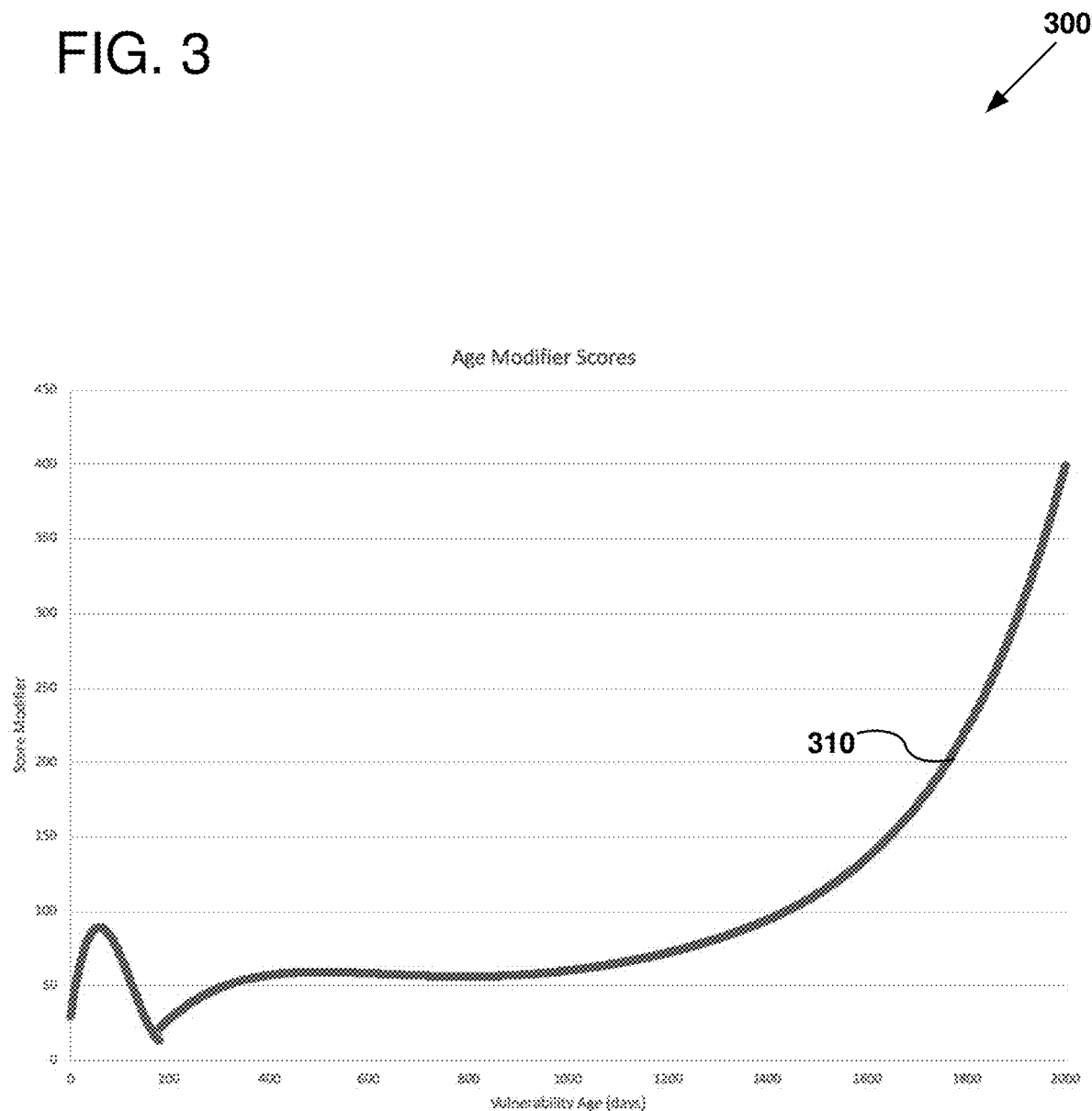
FIG. 3 is a chart outlining a function that can be used to determine an age modifier score in certain implementations of the disclosed technology.

FIG. 3 is a chart 300 outlining a function 310 that can be used to determine an age modifier score. As shown, the relative impact of the vulnerability increases to a local Maxima of 90 within about 75 days. After this first Maxima, the age modifier score is reduced, reaching a local minima just before the vulnerability is 200 days old. After the vulnerability has reached the local minima, the age modifier score generally increases with increasing age of the vulnerability. The age modifier score can be determined empirically based on experience with impact of vulnerabilities in various computing environments. Generally speaking, vulnerabilities typically have a large impact after they have first been identified, before patches or other methods of mitigating the vulnerability are released. However, after methods of mitigating the vulnerability become known, the relative impact of the vulnerability decreases. However, after a certain period of time, systems that do not successfully mitigate the vulnerability will become increasingly impacted with increasing age of respective vulnerability.

VI. Example Determination of Risk Scores and Signal Scores

1. Risk Component

The risk score includes a Risk Component to approximate levels of risk for a vulnerability. The Risk Component can include one or more of the following criteria. As shown, each criteria is associated with an assigned base value. The base values provided below are exemplary, and as will be readily understood to one of ordinary skill in the relevant art, can be adjusted in order to change factors emphasized in the risk score.

Exposure
    Description: Level of Public Information Disclosure
    Base Value: 0
Local Availability
    Description: Local attacks against availability, for example, local denial of service (DoS) attacks.
    Base Value: 1
Remote Availability
    Description: Remote attacks against availability, for example, remote denial of service (DoS) attacks.
    Base Value: 2
Local Access
    Description: Local methods of obtaining or increasing user-level privileges
    Base Value: 3
Remote Access
    Description: Remote methods of obtaining or increasing user-level privileges
    Base Value: 4
Local Privilege
    Description: Local methods of obtaining administrative privileges
    Base Value: 5
Remote Privilege
    Description: Remote methods of obtaining administrative privileges
    Base Value: 6

While a Base Value is prescribed above for each risk component, it is often desirable for these values to be fluid, allowing for customization of the order in which the Risk Component is assigned within the computing environment. In addition to the base Risk Component element, Risk Components can also have a subset assignment (Rsa). The default value can be selected when a subset assignment is not specified, for example, fifty (50). The subset assignment may vary based on the Risk Component level and specific subsets may be defined separately from this specification. In disclosed examples, the Risk Component subset assignment ranges between zero (0) and one hundred (100), but as will be readily understood to one of ordinary skill in the relevant art having the benefit of the present disclosure, other assignment ranges can be assigned to the Risk Component subset.

2. Skill Component

A Skill Component is a criteria used to estimate skill required to use a particular exploit. The Skill Component can include one or more of the following criteria. As shown, each criteria is associated with an assigned base value. The base values provided below are exemplary, and as will be readily understood to one of ordinary skill in the relevant art, can be adjusted in order to change factors emphasized in the risk score. The Skill Component approximates level of skill required for an attacker to use the respective exploit.

Automated Exploit
    Description: An exploit is available in an exploit kit, exploit framework, or malware.
    Base Value: 1
Easy
    Description: Fully functional exploit code is available, likely in an exploit repository.
    Base Value: 2
Moderate
    Description: Exploit Code is available but may not be fully functional, it may work on a single target or with hardcoded values.
    Base Value: 3
Difficult
    Description: A proof of concept is available with limited functionality.
    Base Value: 4
Extremely Difficult
    Description: Minimal details are available such as a write-up, no code is available.
    Base value: 5
No Known Exploit
    Description: No details or exploits are available.
    Base Value: 6

While a Base Value is prescribed above for each risk component, it is often desirable for these values to be fluid, allowing for customization of the order in which the Risk Component is assigned within the computing environment.

In addition to the base Skill Component, these Skill Components may also have a respective subset assignment (Ssa). In some examples, when a subset assignment is not specified the default can be sent to a predetermined value, for example, one (1). The subset assignment may vary based on the Skill Component level and specific subsets may be defined separately. When a subset assignment is specified, an assignment reference URL (arURL) may also be assigned. This URL (Uniform Resource Locator) is a reference point that demonstrates why a specific Skill Component and subset assignment were selected. In an illustrative example, the Skill Component subset assignment ranges between zero (0) and ten (10), although, as will be readily apparent to one of ordinary skill in the relevant art having the benefit of the present disclosure, other ranges of values may be used in other examples.

3. Age Component

An Age Component can be included in the risk score in order to emulate real world risk of exploits, which typically exhibit a sharp increase and decline in prevalence, followed by a much slower increase as the vulnerability ages. The age value is calculated against one of two polynomials depending on the age of the vulnerability.

In some examples, and assigned vulnerability age may be calculated as:

AGE=TODAY( )–PublicationDate.

When an Age Component is not available (for instance, due to a missing PublicationDate), the AGE may be considered to be zero (0).

4. Categorization Component

The Risk Score may have additional categorization. There is no limit to the number of categories that can exist or that may be applied to a single vulnerability. In some examples, each category has a classification. A respective weight can be assigned to the category (Wcat) and to its classification. In this example, both Wcat and Wclass are assigned a weight that is an integer between negative one hundred (−100) and one hundred (100), although as will bew readily understood to one of ordinary skill in the relevant art having the benefit of the present disclosure, other values for the Range may be used. In some examples, when no categorization is provided, the value is assumed to be zero (0).

5. Modifiers

Modifiers are reporting based modifiers that present improved prioritization to the end user.

6. Crown

In some examples, a vulnerability to be scored can be "crowned." For example, a crowned vulnerability may be designed (e.g., by a user or a vulnerability authority) to highlight a risk that a vulnerability emergency response team (VERT) deems critical to the customer base. In an illustrative example, when a vulnerability is crowned, it is assigned a value between one (1) and one hundred (100). As will be readily understood to one of ordinary skill in the relevant art having the benefit of the present disclosure, other ranges of values can be used. When a crown is applied, all additional scoring methodology is abandoned for the respective vulnerability. This subjective scoring mechanism elevates the crowned vulnerability to match the highest calculated vulnerability score in a report and adds the assigned value. This ensures a prioritized list of the most critical vulnerabilities appears at the top of the report.

7. Resolution Modifier

In some examples, a Resolution Modifier is provided. The Resolution Modifier is a reporting modifier provided to enable mitigation based on greater levels of resolved risk. When the resolution modifier is enabled at reporting time, vulnerabilities are grouped. The application of this modifier can be applied by having all vulnerabilities impacted by a single patch commonality to have their vulnerability scores summed. The sum of these scores is divided by the total number of vulnerabilities to be prioritized, for example, as expressed below and shown in FIG. 4.

$$\frac{\sum \text{Commonality}_{score}}{\sum \text{Vulnerability}_{count}}$$

VII. Example Operations for Providing Vulnerability Score with Risk Score Component This section describes operations that can be used to provide a vulnerability score comprising a risk score component. This score may be used prioritize a single vulnerability.

1. Risk Component Calculation

In some examples, a Risk Component may be calculated as the product of the factors of manipulated versions R and Rsa, as shown below and in FIG. 5.

$$\text{RISK} = R^3 \times \left(1 + \frac{Rsa}{100}\right)$$

2. Skill Component Calculation

In some examples, Skill Component may be calculated as the product of two factors. The first factor is the constant ⅗. The second factor is Ssa (Skill Subset Assignment). In this example, the product of these factors is the Skill Component, as shown below and in FIG. 6.

$$\text{SKILL} = \frac{3}{S} \times Ssa$$

3. Age Component

As mentioned previously in the specification, an Age Component may be determined by plugging the age delta (Da) into a polynomial based on the delta value. An example of age delta calculation and a suitable polynomial expression suitable for calculating an example Age Component is provided below and in FIG. 7.

$Da$=TODAY–PublicationDate

AGE=$7\times10^{-5}x^3-0.0259x^2+2.3029x+29.073$ $Da\leq180$:

AGE=$2\times10^{-13}x^5-1\times10^{-9}x^4+2\times10^{-6}x^3-0.0019x^2+0.8393x-79.02$ $Da>180$:

4. Categorization Component

A Categorization Component is based on determining a set of classification weights (Wclass). Each Wclass value is determined by calculating that classification as a percentage of the total classification sum.

Example: If you have Category 1 and Category 2, both members of Classification A (weight 15) as well as Category 3, a member of Classification B (weight 30), you would determine the Wclass values using the operations shown below and in FIG. 8:

$W\text{class}_{total} = (\text{Classification} A \times 2) + (\text{Classification} B)$ $W\text{class}_{total} = (15 \times 2) + 30$ $W\text{class}_{total} = 60$ $W\text{class}_A = \frac{15}{60} = 0.25$ $$W\text{class}_B = \frac{30}{60} = 0.5$$

In this example, the weight of Classification A is 2 because we have two categories in that classification. Once the Wclass values are determined, Wcat is determined by multiplying each category weight by the Wclass value and then summing those factors. The Categorization Component value is determined by summing the Wcat values.

Continuing the above example, assume the following assignments:
Category 1: 50
Category 2: 60
Category 3: 10
Wcat it is determined for Classification 1 by:

(50×0.25)+(60×0.25)=27.5

Wcat it is determined for Classification 2 by:

10×0.5=5

And so the value of the Categorization Component is determined to be:

C=27.5+5=32.5

5. Risk Score Determination

The Risk Score it is determined using the values determined above and the expression below and in FIG. 9:

$$\text{SCORE} = \text{RISK} \times \text{SKILL} \times \frac{\text{AGE}}{10} \times \left(1 + \frac{\text{CAT}}{100}\right)$$

VIII. Example Operations for Providing Vulnerability Score with Risk Score Component A security configuration management score (SCM score) is a scoring system designed to score security configuration management results. In the illustrated example, there are primary, secondary, and tertiary scoring components that comprise the SCM score. As will be readily understood to one of ordinary skill in the relevant art having the benefit of the present disclosure, other combinations of scoring components can be used to provide an SCM score.

In the example described below, there are primary components (including, e.g., a Remote Access Component, a network Component, and/or a Class of Policy Component), secondary components (including, e.g., a Policy Visibility Component, a Distance Component, and/or a Cryptography Component), and tertiary components (including, e.g., a Confidentiality Component, an integrity Component, and/or an Availability Component).

6. Primary SCM Components
a) Remote Access Component (R)

This measurement determines if the policy has an impact on remote access. Does violation of the policy allow remote access? Could it have an krypton or fee on remote access? 2 examples of factors that can be used in a Remote Access Component are:
True
Description: The policy impacts remote access.
Base Value: 1.0
False
Description: The policy does not impact remote access.
Base Value: 0.5 b) Network Service Component (N)

Network (listening) services greatly increase the attack surface of a host. It is important to determine if the configuration in question impacts a network service. 2 factors that can be used and computation of a Network Service Component are:
True
Description: The configuration impacts a network service.
Base Value: 1.0
False
Description: The configuration does not impact a network service.
Base Value: 0.5 c) Class of Policy Component (P)

Class of Policy Component can be a multiplier based on the categorization (class) of the policy. As new policy classes are defined, a default multiplier must be assigned to them. In some examples, values of this multiplier ranges between 0 and 1 and defines the importance of the policy. Each policy class should have a default value, but ultimately all classes should be customer configurable.

7. Secondary SCM Components

In some examples, the SCM Score can include one or more secondary components to add prioritization to the primary score. Primary scores tend to be relatively generic, covering only the most critical components The secondary scoring may be used to set scored results apart and allow them to be easily prioritized.

a) Policy Visibility Component (V)

The frequency with which a specific policy or measurement exists is a clear indicator of the importance of the policy. If a measurement is a one-off, existing only in a specific policy, it is likely less important than a more standardized measurement that exists in all public policies.

b) Distance Component (D)

Another way to think of distance is deviation. How far does the configuration deviate from the default value assigned by the benchmark or policy.

c) Cryptography Component (E)

If the change is related to cryptography, the change should be prioritized ahead of non-cryptographic changes.
True
Description: The policy is cryptography related.
Base Value: 1.25
False
Description: The policy is not cryptography related.
Base Value: 1.0

8. Tertiary SCM Components

Examples of tertiary components can include Confidentiality, Integrity, and/or Availability Components. These Components may be included in some but not all examples of the disclosed SCM score.

a) Confidentiality Component (C)

A Confidentiality Component is a measure of the loss of confidentiality that occurs when a configuration does not match that of the policy, benchmark or standard. Examples of factors that can be used to determine a Confidentiality Component include:
High
Description: A total loss of confidentiality.
Base Value: 0.56
Low
Description: A partial loss of confidentiality.
Base Value: 0.22
None
Description: No loss of confidentiality.

Base Value: 0.0
b) Integrity Component (I)
An Integrity Component is a measure of the loss of integrity that occurs when a configuration does not match that of the policy, benchmark or standard.
High
Description: A total loss of integrity.
Base Value: 0.56
Low
Description: A partial loss of integrity.
Base Value: 0.22
None
Description: No loss of integrity.
Base Value: 0.0
c) Availability Component (A)
A measure of the loss of availability that occurs when a configuration does not match that of the policy, benchmark or standard.
High
Description: A total loss of availability.
Base Value: 0.56
Low
Description: A partial loss of availability.
Base Value: 0.22
None
Description: No loss of availability.
Base Value: 0.0

IX. Example Determination of SCM Score

This section explains operations that can be used to determine the Primary, Secondary, and/or Tertiary scores that may be associated with a particular SCM score.

In this example, a primary score can be determined by adding the Remote Access (R) and Network Service (N) values and multiplying the values by the Class of Policy (P) as shown by the expression below and in FIG. 10.

$$Primary=(R+N) \times P$$

In this example, secondary score is determined by calculating individual secondary score components and then combining those secondary score components.

1. Policy Visibility Determination

Policy Visibility (V) is determined using one or more of the following aspects of the result being scored. The total (T) number of benchmarks or standards that apply to a system is required as is the number of benchmarks or standards that contain the particular policy (P). Policy Visibility can be determined using the expression below, or as shown in FIG. 11.

$$V = 1 + \frac{p-1}{T}$$

2. Distance Calculations

Distance (D) can be determined using the positive distance (count) from the benchmark value (Di) and the default value assigned to the benchmark (De) as shown in the expression below, or as shown in FIG. 12.

$$D = \min\left(1 + \frac{Di}{De}, 2\right)$$

In this example, the SCM Secondary Score may be determined by multiplying the three components, as shown in the expression below or as shown in FIG. 13.

$$Secondary = V \times D \times E$$

In this example, the SCM Tertiary Score may be determined by using the expression below, or as shown in FIG. 14.

$$Tertiary = 2.63 \times (1+C) \times (1+I) \times (1+A)$$

In this example, the SCM Score may be determined by combining the primary component with the secondary components (if used), and/or tertiary components (if used), as shown in the expression below, or as shown in FIG. 15.

$$Result = Primary \times Secondary \times Tertiary$$

X. File Integrity Monitoring Score

A file integrity monitoring (FIM) score may be selected to represent the risk presented when a file integrity monitoring service detects a change in one or more files of a computer file system or database. In the example presented below, there are primary and secondary scores involved in the generation of a FIM Score. As will be readily understood to one of ordinary skill in the art having the benefit of the present disclosure, other scores can be combined in order to provide a FIM score.

1. Primary FIM Components

Primary components of an FIM score can be used to represent attributes of files and file systems, for example static attributes of a file or attributes that define the importance of a file within the file system.

a) File Source Component ($F_s$)

A File Source Component describes the origin of the file. The categorization of files according the following sources or values may allow for further adjustment by users or administrators of described computing systems.

Vendor
Description: Files that originate from the operating system. Components of the original OS installation.
Base Value: 1.0
Third Party
Description: Files that originate with application installs.
Base value: 0.66
User
Description: User defined data.
Base Value: 0.33

File Location Component ($F_L$)

A File Location Component describes the install location of a corresponding file. The location of files according the following parameters may allow for further adjustment by users or administrators of described computing systems.
System
Description: Files located in system directories.
Base Value: 1.0
Application
Description: Files located in application directories.
Base value: 0.66
User
Description: Files located in user directories.
Base Value: 0.33 b) File Type Component ($F_T$)

The File Type Component describes the type of a file. File types may be automatically determined or predefined. Users or administrators may be able to indicate which category a specific file occupies.

Executable
  Description: Files that are executable. On Windows, this would include files of the type EXE, DLL, and SYS. On Linux, these would be determined by the execute flag.
  Base Value: 1.0
Configuration
  Description: Files that contain known configuration data. This would include files such as CONF and INI or files stored in locations like /etc/.
  Base value: 0.66
Data
  Description: Files that cannot be categorized as Executable or Configuration.
  Base Value: 0.33 c) Signedness Component (S)

The Signedness Component indicates whether or not a file is signed. For example, a file can be signed by combining a key, such as a cryptographic cipher or other suitable key, with the file name and/or contents. Changes to signed files carry reduced risk because the file's authenticity can be verified using the key that was used to sign the key (or a corresponding symmetric key).

True
  Description: The file is signed.
  Base Value: 0.5
False
  Description: The file is not signed.
  Base value: 1.0

2. Secondary FIM Components

The secondary score may be incorporated into the FIM score and provides a method of measuring the change. If the primary score is qualitative, the secondary score can be considered quantitative. In some examples, the FIM Component can include file permissions, file ownership, and/or file contents subcomponents.

a) File Permissions Component ($F_P$)

The File Permissions component indicates whether or not the read, write, and execute permissions on the file have changed. In some examples, these values are not cumulative and the max value is returned when multiple changes occur.

Execute
  Description: The execute permissions were changed.
  Base Value: 0.33
Write
  Description: The write permissions were changed.
  Base Value: 0.22
Read
  Description: The read permissions were changed.
  Base Value: 0.11
No Change
  Description: None of the permissions were changed.
  Base Value: 0.0 b) File Ownership Component ($F_O$)

The File Ownership Component indicates whether or not the owner or groups associated with a file have changed. In some examples these values are not cumulative and the max value is returned when multiple changes occur.

Owner
  Description: The owner of the file has changed.
  Base Value: 0.33
Configuration
  Description: The group(s) associated with the file have changed.
  Base Value: 0.165
No Change
  Description: Neither the owner nor the group(s) have changed.
  Base Value: 0.0 c) File Contents Component ($F_C$)

The File Contents Component indicates whether or not the contents of the file have changed. This can be accomplished in any suitable fashion, for example, by checking for different file lengths, by performing a "diff" comparison on the file, or by comparing hash values with a known hash value for the file (e.g., by comparing MD5 or SHA hashes generated using the file contents). Detected differences indicating a change has occurred.

Change
  Description: The contents of the file changed.
  Base Value: 0.34
No Change
  Description: The contents of the file did not change.
  Base value: 0.0

XI. FIM Score Determination

This section explains operations that can be used to determine the FIM Score. Specific values used in the operations described below may be varied in any suitable fashion, as will be readily understood to one of ordinary skill in the art having the benefit of the present disclosure.

1. Primary Score Determination

In the described example, the FIM Primary score has a maximum value of 10.0 and represents the impact (risk) of the detected file change. In this example, the FIM Primary score may be determined using the following expression or as shown in FIG. 16:

$$\text{Primary}=\text{round}(10(S \times F_S \times F_L \times F_T),2)$$

2. Secondary Score Determination

In the described example, the FIM Secondary score provides a value between 0 and 1 that represents the amount of change that has occurred. The less change that occurs, the more the secondary score reduces the primary score. In this example, the FIM Secondary score can be determined using the following expression or as shown in FIG. 17:

$$\text{Secondary}=\text{round}(F_P+F_O+F_C,2)$$

FIM Score Calculation

The FIM score can be determined by combining the primary and, if used, secondary score determinations described above. The final score is returned as just the primary when a secondary score is not determined. When the secondary score is also determined, the score is calculated using the following expression, or as shown in FIG. 18:

$$\text{Final}=\text{Primary} \times \text{Secondary}$$

XII. Signal Score

As disclosed herein, a signal score provides a means of contextualizing an element's risk within the organization. An element may refer to a vulnerability, configuration, or any other element for which a score can be generated. Just as the element being manipulated can vary, so can the source of the signal. In certain examples of the disclosed technology, a signal file is provided for each developed signal, allowing for hundreds or thousands of signals to exist and impact scoring within an organization.

In certain examples, each signal is made up of a set of directives that impact the processing and application of the signal to an element. In some examples, multiple signals are applied and individual signal scores are determined to that they may be combined into an overall signal score. In certain examples, a signal score does not include period or age-based calculations.

3. Signal Components

A signal score is determined by combining one or more of the following signal components. Typically, a signal score will include the name, description, signal type, and test components a) Name The Name Component is a unique name of the associated signal.

b) Description

The Description Component is a description explaining the purpose of the signal and optionally other data that may be specified by users or administrators of the computing system.

c) Signal Type Component

A signal may be applied at various points in the scoring and reporting process. Typically, a signal type identifies at which point it is applied.

Element—Applied to a single scoring element (e.g., a vulnerability)

Host—Applied to the final host score rather than a specific element.

Network—Applied to the final network score rather than a specific host or element.

d) Criticality Component

In some examples, the Criticality Component of a signal indicates the minimum and maximum impact that a signal can have on a score. In one particular example, there are 10 levels of criticality defined by the integers 1 through 10. Each level represents a 20% increase in max criticality, while the midpoint remains at 0. Thus, in this example, the maximum criticality may be determined using the following expression, or as shown in FIG. 19:

Maximum: Criticality×20%
Minimum: −(Criticality×20%)

Here are examples of particular criticality levels that can be used in accordance with the disclosed signal score operations.

Criticality 1
   Minimum: −20%
   Maximum: 20%
Criticality 5
   Minimum: −100%
   Maximum: 100%
Criticality 10
   Minimum: −200%
   Maximum: 200% e) Data Source Component

Within the signal calculator, there may be plugins available for each available data source. As used in describing Signal Score determinations, a Data Source is any product or service that can provide unique or useful data. In some examples, sources available are determined by the plugins available at runtime. If an unknown data source is referenced the signal should be desirably skipped and logged.

f) Data Value Component

The Data Value component may be a string that is passed to the Data Source plugin allowing the correct data to be returned. For example, this may be a dictionary key, a variable name, or any other unique identifier used by the Data Source. If the Data Value is not known by the Data Source plugin, the signal should be processed using the No Data Source Available logic.

g) Test Count

The test count indicates the number of tests that are associated with the signal. Desirably, a signal has at least 2 associated tests.

h) Test Method

A Test Method is a method by which a test is evaluated against Data Value. Supported evaluation methods include:

REGEX: A regular expression.
FUNCTION: A function (e.g., a Python function) that is executed with a single variable (data_value) containing the contents of Data Value.
STRING: An exact string match, if a substring is required use REGEX.
INT: An integer match.
BOOL: A Boolean match (True/False).

i) Per Test Data Component

Each test can include a definition, an execution order, and a mapping. Tests are executed according to their execution order in descending order. In some examples, a test executes and return the first matched test, and then execution the test stops after a test matches.

j) Test Definition Component

The name of the test, which may desirably describe the purpose of the test.

k) Execution Order Component

An Execution Order component is an indicator of when to execute the specific test specified with distinct integers and sorted from highest to lowest.

l) Data Match Component

A Data March component specifies the data to be matched against Data Value using the Test Method.

m) Midpoint Identifier Component

The Midpoint Identifier determines which of the levels is considered to be midpoint of the signal levels. All criticality multipliers are determined based on the midpoint having a value of 0. If the Midpoint Identifier is not provided, it will be determined using the following formula:

$$\text{round}(\text{TestCount} \div 2)$$

n) No Signal Match

A No Signal Match value may be provided. This indicates which level is applied when none of the Test Methods match the available data. If No Signal Match is not provided, the Midpoint Identifier is used in its place.

o) No Data Source Available

A No Data Source Available value may be provided. It indicates which level is applied when the required data source for the signal is not available. If No Data Source Available is not provided, the Midpoint Identifier is used in its place.

XIII. Determination of Signal Score

This section explains a particular example of how to calculate the score of a single signal, multiple signals, and how to apply that score to a single element score, host score, and/or network score.

1. Single Signal Determinations

If a midpoint is not defined for a signal, it can be calculated using the midpoint formula above. Following the successful calculation of the midpoint, the minimum and maximum criticality scores (C) are calculated as described above. Each signal test can be assigned a criticality score. For example, this can be accomplished by performing the operations described below or as shown in FIG. 20:

$T = \text{Test}$ $EO = \text{ExecutionOrder}$ $T_{EO} > MP_{EO} \rightarrow C_{Level} = C_{max} \div (\max(EO) \div MP_{EO})$ $T_{EO} < MP_{EO} \rightarrow C_{Level} = C_{min} \div (MP_{EO} - 1)$ Using the per test criticality score($C_{Level}$), the score of each test can be determined using operations based on the expression below, or as shown in FIG. 21.

$T_{EO} > MP_{EO} \rightarrow T_{score} = C_{Level} \times (T_{EO} - MP_{EO})$ $T_{EO} = MP_{EO} \rightarrow T_{score} = 0$ $T_{EO} < MP_{EO} \rightarrow T_{score} = C_{Level} \times T_{EO}$ At the end of this series of calculations, the resulting value (between −200% and 200%) can be used to manipulate a base score or to generate a bulk signal score.

2. Bulk Signal Calculations

In some examples, to generate a combined signal score, at least one, and desirably all, of the single signal score determinations described above are performed. In some examples, scores are normalized (e.g., to a range between 0 and 1) and them summed to get the combined signal score as described by the expression below and as shown in FIG. 22.

$$\text{Signal}_{new} = \frac{\text{Signal} - \text{Signal}_{min}}{\text{Signal}_{max} - \text{Signal}_{min}}$$

$$\text{Signal}_{element} = \sum \text{Signal}_{new}$$

Desirably, scores are normalized across a computing element, host, or network. To do this, all signals for all elements are calculated and the values of $\text{Signal}_{max}$ and $\text{Signal}_{min}$ used are the highest and lowest signal results from all elements, not just the element being scored.

3. Applying Signal Scores

Signal scores can be applied to a element scores after the bulk signal calculation is completed. Typically, the method of applying these scores is the same at the element, host, or network level. The signal score is used as a multiplier against the base score for the element, providing final risk. This means that elements with multiple signals may score higher than elements with fewer signals. This is an aspect of the scoring system design, as it is likely that more important elements will have a greater number of signals applied to this. It is for this reason that the use of the highest levels of signal criticality should desirably be used sparingly. Thus, a calculation of the Risk Score for a computing element, host, network, or other computing arrangement can be determined using the expression below or as shown in FIG. 23.

$\text{RISK} = \text{SCORE} \times \text{Signal}_{element}$

XIV. Examples of Practical Applications of Signal Score

This section describes a number of different practical applications of signal scores in a suitably configured computing environment. As will be readily understood to one of ordinary skill in the art having duty benefit the present disclosure, practical applications of the signal score is not limited to the examples provided, can be applied to any suitable aspect of such computing environments. For example, signal scores can be determined for computing system aspects such as:

- DNS Name: For example, when a data base vulnerability on a stub domain may require additional attention because it is not in a control environment.
- Service Availability: a vulnerability may have an increased risk services is labeled in an increased risk when the services installed.
- IoC: IoC as an indicator of compromise such as file hashes that can be used as a signal score for FIM scoring.
- The System Configuration: while a network share may allow access to all or a large number of network users, use of NTFS permissions may be reduced or mitigate the risk.
- Firewall Rules: a listing service may have limited accessed due to specific firewall rules that filter access.

XV. Vision Score

In some examples, a vision score can be used in addition to, or instead of, a signal score. While the component scores provide a prioritization of risk on the network, the vision score is selected to provide a holistic view of risk on the network. In some examples, a vision score includes scoring elements from the component scores. For example, each component can be weighted such that the sum of the weights is 100. In one example, the default weighting is 34% VM, 33% SCM, 33% FIM. If any one of these components are missing, their weight is assigned to be zero (0).

In some examples, the vision score is calculated by populating a number of "buckets" related to a specific vulnerability. The sum of those values is used to determine the vision score for an asset. If a vulnerability has been crowned, this operation is skipped and the vision score value is set to 100. Examples of buckets that can be used in determining one examples of a vision score follow below:

1. CVSS Score Bucket

The first 10 point bucket is derived directly from the CVSS Score. If the CVSS Score is 7.1, this component scores 7.1 points out of 10.

2. Exploit Availability Bucket

The exploit availability bucket is filled with 10 points if an exploit is available and empty (zero/0 points) if an exploit is not available.

3. Exploit Source Bucket

The exploit source bucket is populated when Exploit Availability is set to 10 and is comprised of 20 points. The point assignment can be performed as follows:

- Minimal technical details—1 point
- Minimal proof of concept—2 points
- Full technical details—4 points
- Functional proof of concept—5 points
- Working exploit code—10 points
- Documented on exploit database—10 points
- Included in an exploit kit or exploit framework—15 points Included in multiple exploit kits or exploit frameworks—20 points 4. Risk Bucket The risk bucket is based on the RISK component of the TRSS VM Component Score. Much like 10.1.1 CVSS Score, this uses a 1:1 mapping.

5. Patch Priority Index (PPI) Bucket

The Patch Priority Index (PPI) bucket is filled with 10 points if the vulnerability is included in the PPI and 0 points if it is not.

6. Scoring Modifiers Bucket

The scoring modifiers bucket is filled with 10 points if the classification is set on a vulnerability and 0 points if it is not. The mapping of associated classifications will be tracked in a vendor's database and not documented here.

7. Critical Vendors Bucket

The critical vendors bucket is filled with 10 points if the classification is set on a vulnerability and 0 points if it is not. The mapping of associated classifications will be tracked in the vendor database and not documented here.

8. Vulnerability Age Bucket

This is based on the following mapping from a vulnerability age to its bucket score:

Vulnerability Age<=90 days—2 pts
90<Vulnerability Age<=180—1 pt
180<Vulnerability Age<=365—3 pts
365<Vulnerability Age—4 pts 9. Vulnerability Component Score This is a mapping of TRSS Component score. These ranges are currently from zero to a maximum of 10 points.

XVI. Vision Score Calculation

In this illustrative example, the Vision Score is calculated by summing the values of each of the bucket items identified above. The resulting sum is then divided by the count of vulnerabilities to determine an overall average. The set of scores at or above the 80th percentile can then be identified using the nearest-rank method. The Vision score is computed as the average of this set of numbers along with the initially computed overall average.

As will be readily understood to a person of ordinary skill in the relevant art having the benefit of the present disclosure, other combinations of values can be used to calculate the vision score. For example, a limited number of buckets might be used: for example: only 1, 2, 3, 4, 5, 6, 7, or 8 of the buckets might be summed into the vision score. In some examples, a coefficient may be applied to one or more of the buckets to scale the individual bucket score. Other combinations of the buckets may be used as well, depending on a particular application of the disclosed technology.

10. Example Vision Score Calculation Example

In this example, the vision score has a maximum limit of 1000 points. Assuming default values (34% for VM Vision), means that the maximum VM Vision Component is 340. Assuming 10 vulnerabilities with the following scores: 70, 88, 50, 42, 100, 30, 90, 75, 9, and 95, the sum of the vulnerabilities is 649. The average is 64.9. Next, the 80th percentile score is calculated. After sorting the list of scores in increasing order:

9, 30, 42, 50, 70, 75, 88, 90, 95, 100

$$\left\lceil \frac{80}{100} \times 10 \right\rceil = 8$$

Our index to the list is 8, so scores in the 80th percentile and above are 90, 95, and 100. The original average of is taken 64.9 and summed with the three numbers identified above. The sum of these 4 numbers is 349.9. The average is: 87.475. For this example, the VM Vision Score Component is 340×87.475% or 297.415.

XVII. Example Security Configuration Management (SCM) Vision Score

In this example, the security configuration management (SCM) Component Scores are scored out of 100, putting this on a 100 point scale. The SCM Vision Score is simply calculated by taking the sum of the SCM Scores for a host and dividing them by the number of failed tests.

11. SCM Vision Score Calculation

The Vision Score is a maximum of 1000 points. Assuming the default values (33% for SCM Vision) means that the maximum SCM Vision Component is 330. Assume there are 10 failed tests with the following scores: 70, 88, 50, 42, 100, 30, 90, 75, 9, 95. The sum of the failed tests is 649. The average is 64.9. In this example, the SCM Vision Score Component is 330×64.9% or 214.17.

XVIII. File Integrity Monitoring (FIM) Vision Score

In some examples, the FIM Vision Score is calculated based on the FIM highest component score as well as the SCM and VM scores for a host. Each other component, SCM and VM is responsible for 50% of the weighting, however, if only one component is available then it accounts for 100% of the weighting. This method is applied because unreconciled FIM changes need to be considered as part of the overall security posture of the system.

12. FIM Vision Score—SCM Component

The SCM Component Score can be split into 4 criticality levels. If the VM component is missing, each value is doubled.
Critical—50% (100%)
High—37.5% (75%)
Medium—25% (50%)
Low—12.5% (25%)
13. FIM Vision Score—VM Component
The VM Component Score is split into 4 criticality levels. If the SCM component is missing, each value is doubled.
Critical—50% (100%)
High—37.5% (75%)
Medium—25% (50%)
Low—12.5% (25%)

XIX. Example FIM Vision Score Calculation

In this example, the Vision Score is a maximum of 1000 points. We'll assume the default values (33% for FIM Vision). This means that the maximum FIM Vision Component is 330. As an example, assume 10 FIM changes with the following scores: 7.0, 8.8, 5.0, 4.2, 9.2, 3.0, 9.0, 7.5, 1, and 9.5. Take the highest score (9.5) and drop the rest. 9.5/10 is 95%, so the calculation is performed with 95% of the FIM Vision Component (330×95%), or 313.5. Assuming that the SCM Component Score is medium (25%) and the VM Component Score is High (37.5%), we end up with a total of 62.5%. The FIM Vision Score Component is 313.5× 62.5% or 195.9375.

XX. Example Asset Vision Calculation

The final vision score is calculated by adding the three vision components. If we use the examples above, the final vision score would be 195.9375+214.17+ 297.415=707.5225, which we round to 708 for the final vision score. The asset group and/or organization vision score can be calculated by finding the average of the asset vision scores.

XXI. Overall System Risk Indicator

Figure 24:
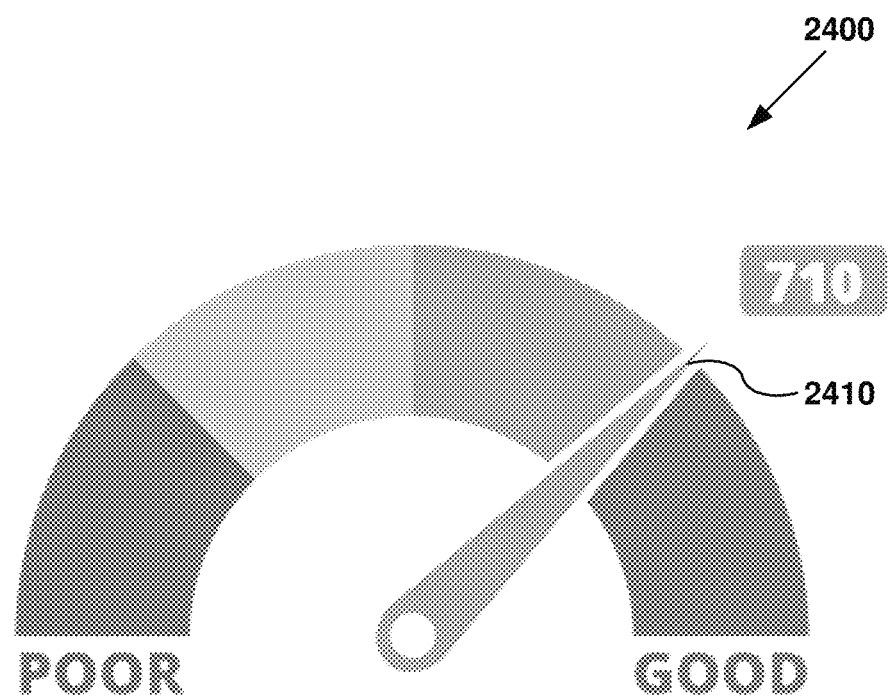
FIG. 24 is an illustration depicting a graphical computer display displaying an overall system risk indicator or "host score."

FIG. 24 is an illustration 2400 that depicts a graphical computer display displaying an overall system risk indicator or "host score." The overall system risk indicator indicates the combined risks for all evaluated components within the computing environment. This allows a quick determination of the relative risk level for the computing environment. As shown, the overall system risk indicator is displayed on a dial scale ranging from "poor" to "good." Here, the overall system risk is scored at 710 as indicated by the graphical dial indicator 2410. As will be readily understood to one of ordinary skill in the art having the benefit of the present disclosure, other suitable graphical displays can be used to display the overall system risk indicator.

XXII. Example Age Modifier Determination

Figure 25A:
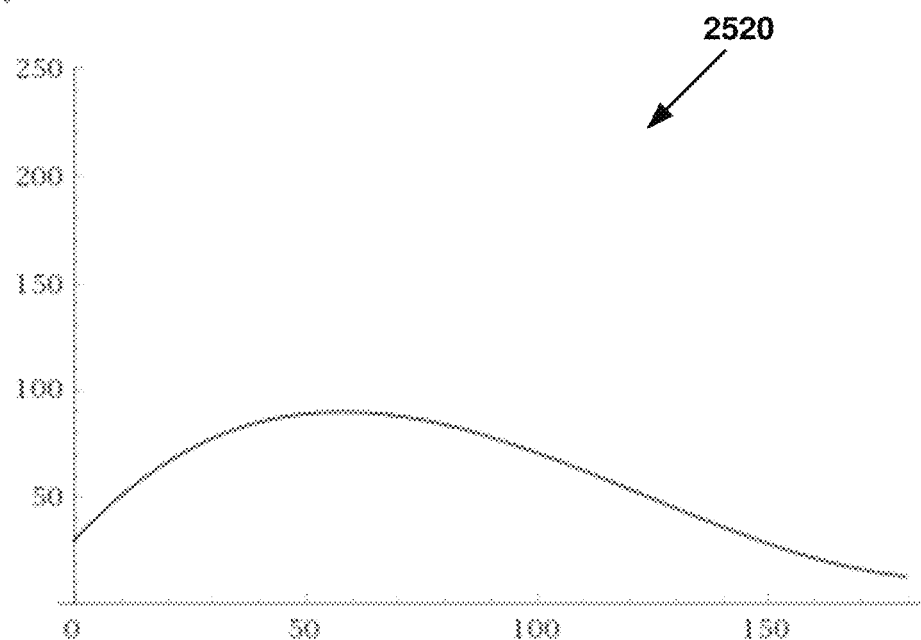
FIGS. 25A-B illustrate an example of determining an age modifier for use in risk score determination, as can be used in certain examples of the disclosed technology.
Figure 25B:
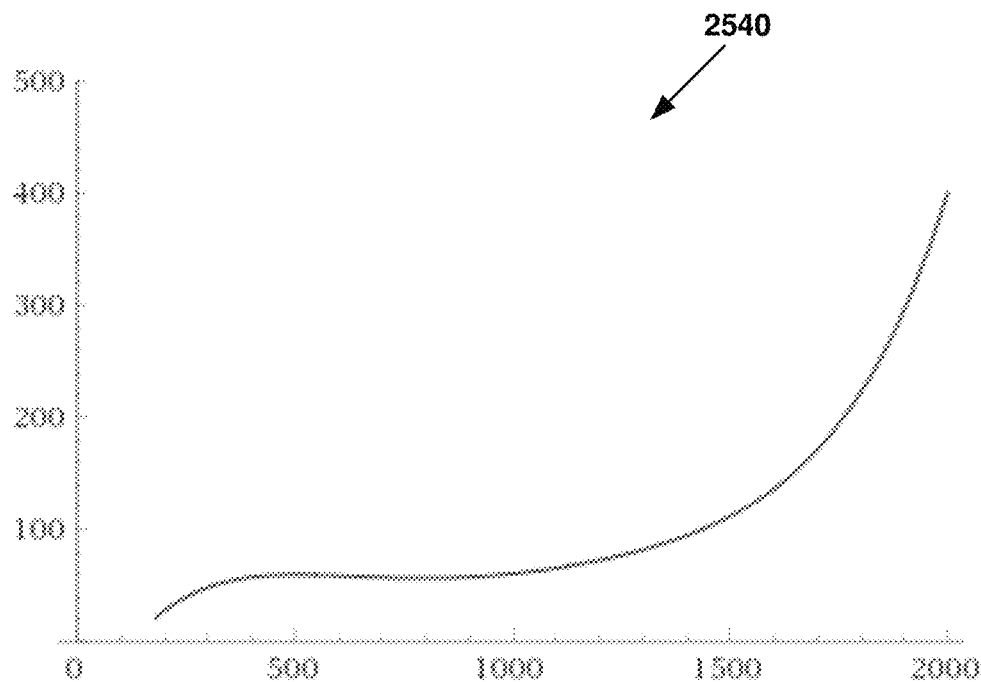

FIGS. 25A-B illustrate an example of determining an age modifier for use in risk score determination, as can be used in certain examples of the disclosed technology. As shown, a two-piece relation is used to model the effect of age. When the age of the vulnerability is less than or equal to 180 days, the first polynomial equation 2510 is used. A chart 2520 graphs the first portion of the age modifier function. When the age of the vulnerability is greater than or equal to 180 days, the second polynomial equation 2530 is used. A chart 2540 graphs the second portion of the age modifier function. These factors can be combined into a single age modifier function.

XXIII. Example Method of Producing a Combined Risk Score

Figure 26:
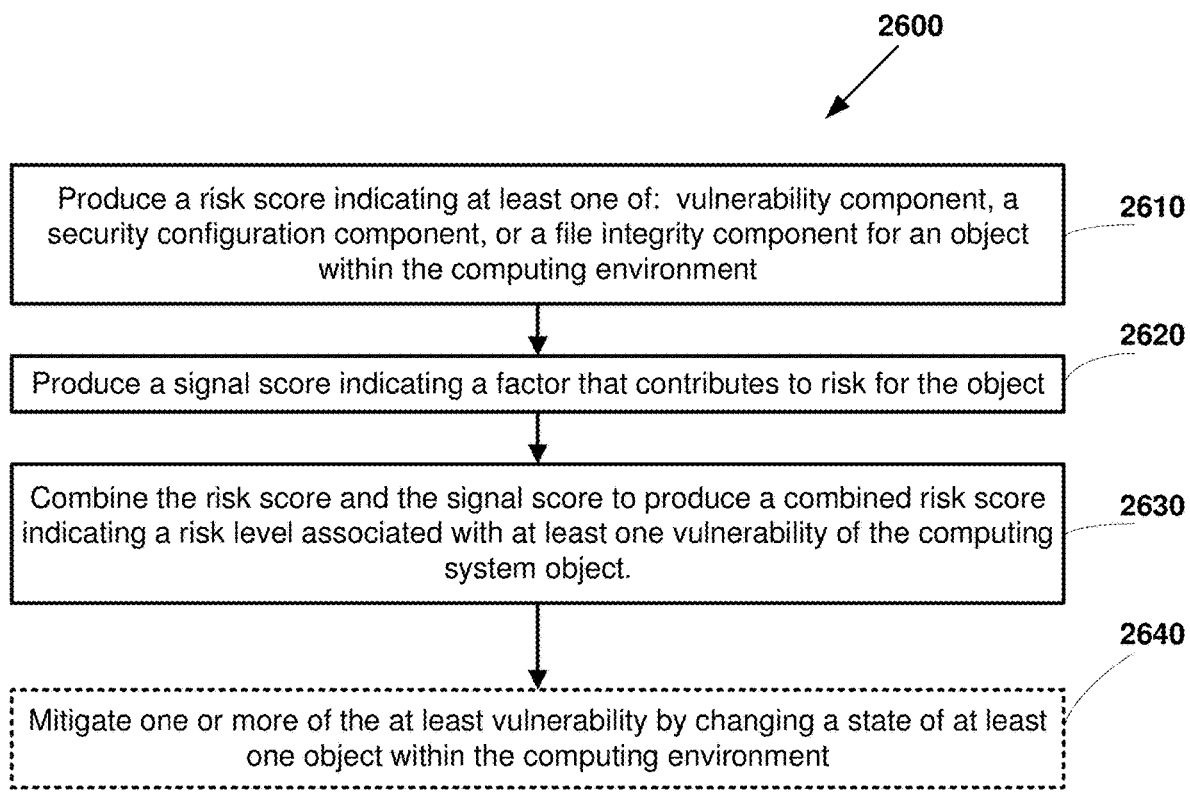
FIG. 26 is a flowchart outlining an example method of producing a combined risk score and mitigating vulnerabilities, as can be performed in certain examples of the disclosed technology.

FIG. 26 is a flowchart 2600 outlining an example method of producing the combined with score, as can be performed in certain examples of the disclosed technology. For example, the computing environment 100 discussed above regarding FIG. 0.1 can be used to perform the illustrated method.

At process block 2610, a risk or is produced that indicates at least one of a vulnerability component, security configuration component, or file integrity component for an object within the computing environment.

At process block 2620, a signal scores produced that indicates a factor that contributes to the relative risk for the object in the environment.

At process block 2630, the risk score and the signal scores are combined to produce a combined with score that indicates a risk level associated with at least one vulnerability of the computing system object.

At process block 2640, the method can optionally include operations to mitigate one or more of the at least one vulnerability by changing state or configuration of at least one object within the computing environment.

XXIV. Example Computing Environment

Figure 27:
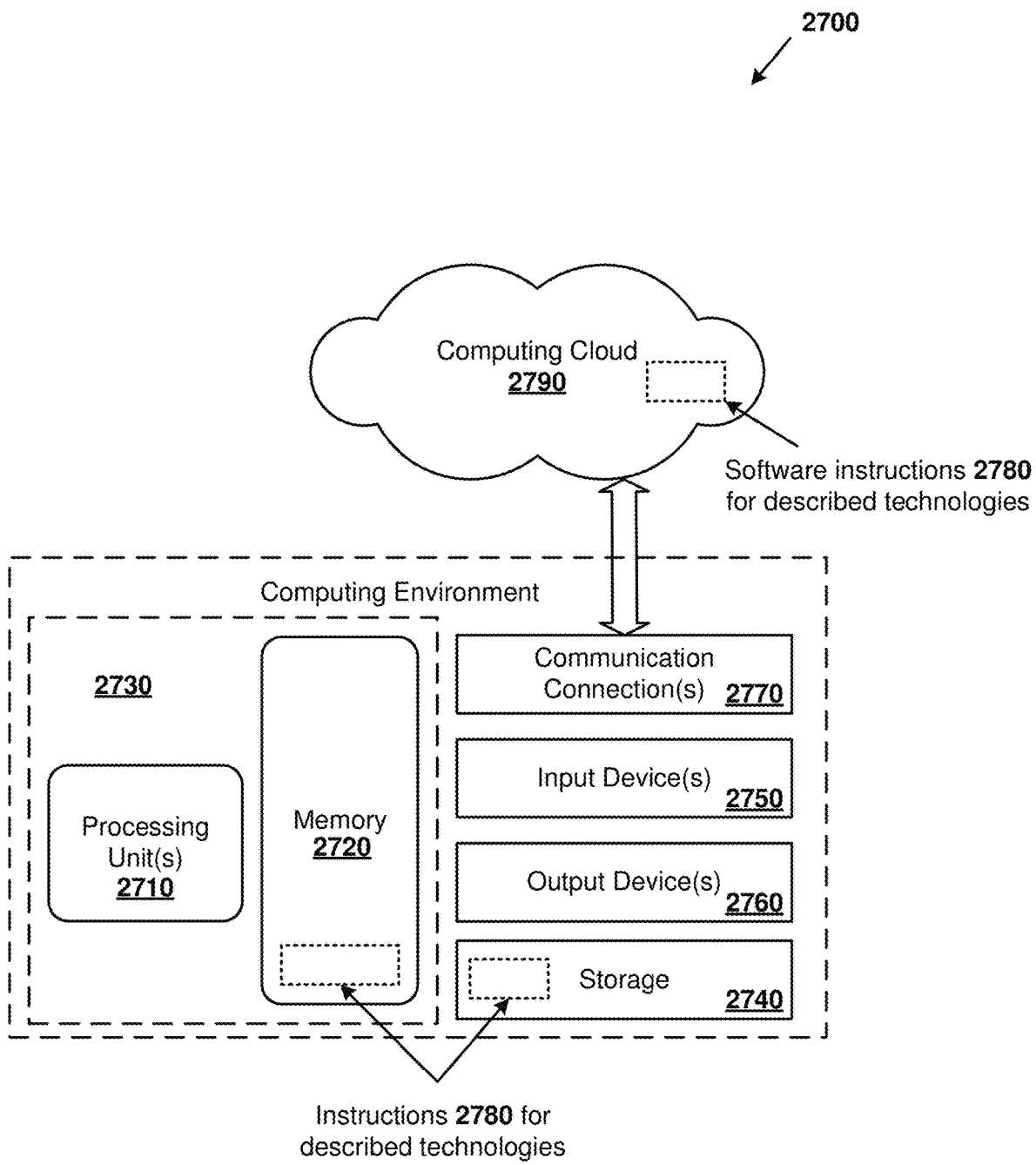
FIG. 27 illustrates a generalized example of a suitable computing environment in which described embodiments, techniques, and technologies, including determining risk scores, signal scores, and mitigating vulnerabilities identified using such scores in a computing environment, can be implemented.

FIG. 27 illustrates a generalized example of a suitable computing environment 2700 in which described embodiments, techniques, and technologies, including determining risk scores, signal scores, and mitigating vulnerabilities identified using such scores in a computing environment, can be implemented. For example, the computing environment 2700 can implement any of the agents, device profiler agent platform servers, and destination agent data consumers, as described herein.

The computing environment 2700 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 27, the computing environment 2700 includes at least one central processing unit 2710 and memory 2720. In FIG. 27, this most basic configuration 2730 is included within a dashed line. The central processing unit 2710 executes computer-executable instructions and may be a real or a virtual processor. In a multi-processing system, multiple processing units execute computer-executable instructions to increase processing power and as such, multiple processors can be running simultaneously. The memory 2720 may be volatile memory (e.g., registers, cache, RAM), non-volatile memory (e.g., ROM, EEPROM, flash memory, etc.), or some combination of the two. The memory 2720 stores software 2780, images, and video that can, for example, implement the technologies described herein. A computing environment may have additional features. For example, the computing environment 2700 includes storage 2740, one or more input devices 2750, one or more output devices 2760, and one or more communication connections 2770. An interconnection mechanism (not shown) such as a bus, a controller, or a network, interconnects the components of the computing environment 2700. Typically, operating system software (not shown) provides an operating environment for other software executing in the computing environment 2700, and coordinates activities of the components of the computing environment 2700.

The storage 2740 may be removable or non-removable, and includes magnetic disks, magnetic tapes or cassettes, CD-ROMs, CD-RWs, DVDs, or any other medium which can be used to store information and that can be accessed within the computing environment 2700. The storage 2740 stores instructions for the software 2780, plugin data, and messages, which can be used to implement technologies described herein.

The input device(s) 2750 may be a touch input device, such as a keyboard, keypad, mouse, touch screen display, pen, or trackball, a voice input device, a scanning device, or another device, that provides input to the computing environment 2700. For audio, the input device(s) 2750 may be a sound card or similar device that accepts audio input in analog or digital form, or a CD-ROM reader that provides audio samples to the computing environment 2700. The output device(s) 2760 may be a display, printer, speaker, CD-writer, or another device that provides output from the computing environment 2700.

The communication connection(s) 2770 enable communication over a communication medium (e.g., a connecting network) to another computing entity. The communication medium conveys information such as computer-executable instructions, compressed graphics information, video, or other data in a modulated data signal. The communication connection(s) 2770 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and destination agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 2790. For example, agents can be executing vulnerability scanning functions in the computing environment while agent platform (e.g., bridge) and destination agent data consumer service can be performed on servers located in the computing cloud 2790.

Computer-readable media are any available media that can be accessed within a computing environment 2700. By way of example, and not limitation, with the computing environment 2700, computer-readable media include memory 2720 and/or storage 2740. As should be readily understood, the term computer-readable storage media includes the media for data storage such as memory 2720 and storage 2740, and not transmission media such as modulated data signals.

In view of the many possible embodiments to which the principles of the disclosed subject matter may be applied, it should be recognized that the illustrated embodiments are only preferred examples and should not be taken as limiting the scope of the scope of the claims to those preferred examples. Rather, the scope of the claimed subject matter is defined by the following claims. We therefore claim as our invention all that comes within the scope of these claims.

What is claimed is:

1. A computer-implemented method of mitigating vulnerabilities within a computing environment, the method comprising:
   producing a risk score based at least in part on a vulnerability component for an object within the computing environment, wherein the vulnerability component comprises at least an age component, wherein the risk score follows a model of:
   from a minimum value for the age component, increasing to a local maxima as the age component reaches a first predetermined age,
   decreasing to a local minima as the age component approaches a second predetermined age from the first predetermined age, the second predetermined age being greater than the first predetermined age, and
   increasing as the age component increases past the second predetermined age;
   producing a signal score indicating a factor that contributes to risk for the object; and
   combining the risk score and the signal score to produce a combined risk score indicating a risk level associated with at least one vulnerability of the computing system object.

2. The method of claim 1, further comprising:
producing a vision score comprising at least one bucket for risk of the vulnerability on the network.

3. The method of claim 1, further comprising:
mitigating one or more of the at least vulnerability by changing a state of at least one object within the computing environment.

4. The method of claim 1, further comprising:
mitigating a vulnerability identified in the computing environment using the combined risk score by changing a state of at least one computing object.

5. The method of claim 1, further comprising:
displaying the risk score, the signal score, the combined risk score, or an overall risk score using a graphical display coupled to a computing device within the computing environment.

6. The method of claim 1, wherein:
the producing the vulnerability score comprises determining at least one of: the age of the vulnerability, the skill required to exploit the vulnerability, or the outcome of a successful exploitation of the vulnerability.

7. The method of claim 1, wherein:
the producing the risk score and/or the signal score comprises indicating a crowned vulnerability deemed to need immediate mitigation.

8. The method of claim 1, wherein:
the risk score is determined by combining at least one of the following components: a risk component, a skill component, an age component, or a categorization component.

9. The method of claim 1, wherein:
the risk score is determined by determining a security configuration management score and/or a file integrity management score.

10. The method of claim 1, wherein:
the signal score is determined by evaluating at least one of a single type component, a criticality component, and/or a test component of an object in the computing environment.

11. The method of claim 1, wherein:
the signal score is based on at least one of: a name component, a description component, a single type component, a criticality component, a data source component, a data value component, a test count, a test method, a per test data component, a test definition component, and execution order component, a data match component, a midpoint identifier component, as no signal match component, or a no data source available component.

12. The method of claim 1, wherein:
the combining the risk score and the signal score is based on a criticality indicated by the signal score.

13. The method of claim 1, wherein:
the producing the vulnerability score, the producing the signal score, or combining the vulnerability score and the risk score includes a factor that contributes to risk for the object.

14. The method comprising computing an overall system risk score by combining two or more combined risk scores generating by the method of claim 1.

15. The method of claim 14, further comprising displaying the overall system risk score on a display coupled to a computing system, the display including at least one of a numerical indication of the overall system risk score, a graphical indicator of the overall system risk score, or a color shaded indicator of the overall system or score.

16. The method of claim 1, wherein the risk score is further produced based at least in part on one or more of a security configuration component and a file integrity component for the object within the computing environment.

17. One or more non-transitory computer readable storage media storing computer readable instructions, which when executed by a computer cause the computer to:
produce a risk score based at least in part on a vulnerability component for an object within the computing environment, wherein the vulnerability component comprises at least an age component, wherein the risk score follows a model of:
from a minimum value for the age component, increasing to a local maxima as the age component reaches a first predetermined age,
decreasing to a local minima as the age component approaches a second predetermined age from the first predetermined age, the second predetermined age being greater than the first predetermined age, and
increasing as the age component increases past the second predetermined age;
produce a signal score indicating a factor that contributes to risk for the object; and
combine the risk score and the signal score to produce a combined risk score indicating a risk level associated with at least one vulnerability of the computing system object.

18. An apparatus, comprising:
a processor; and
one or more non-transitory computer readable storage media storing computer readable instructions, which when executed by the processor cause the apparatus to:
produce a risk score based at least in part on a vulnerability component for an object within the computing environment, wherein the vulnerability component comprises at least an age component, wherein the risk score follows a model of:
from a minimum value for the age component, increasing to a local maxima as the age component reaches a first predetermined age,
decreasing to a local minima as the age component approaches a second predetermined age from the first predetermined age, the second predetermined age being greater than the first predetermined age, and
increasing as the age component increases past the second predetermined age;
produce a signal score indicating a factor that contributes to risk for the object; and
combine the risk score and the signal score to produce a combined risk score indicating a risk level associated with at least one vulnerability of the computing system object.

19. The apparatus of claim 18, further comprising:
a risk score component implemented with an agent executed by a processor or a device profiler coupled to a compute object for which the risk score is determined.

* * * * *